US010604135B2

(12) United States Patent
Zhou

(10) Patent No.: US 10,604,135 B2
(45) Date of Patent: Mar. 31, 2020

(54) RAILWAY CAR BRAKE LOCK

(71) Applicant: Zhicong Zhou, Los Angeles, CA (US)

(72) Inventor: Zhicong Zhou, Los Angeles, CA (US)

(*) Notice: Subject to any disclaimer, the term of this patent is extended or adjusted under 35 U.S.C. 154(b) by 93 days.

(21) Appl. No.: 16/122,168

(22) Filed: Sep. 5, 2018

(65) Prior Publication Data

US 2020/0070800 A1    Mar. 5, 2020

(51) Int. Cl.
  *B60T 17/18* (2006.01)
  *B61H 13/34* (2006.01)
  *B61H 13/02* (2006.01)
  *F16D 65/00* (2006.01)
  *B60T 7/08* (2006.01)
  *F16D 127/06* (2012.01)

(52) U.S. Cl.
  CPC ............... *B60T 17/18* (2013.01); *B60T 7/08* (2013.01); *B61H 13/02* (2013.01); *B61H 13/34* (2013.01); *F16D 65/00* (2013.01); *F16D 2127/06* (2013.01)

(58) Field of Classification Search
  CPC .......... B60T 17/18; B60T 7/08; B61H 13/02; B61H 13/34; F16D 65/00; F16D 2127/06; F16D 63/006

USPC ......................................................... 188/265
See application file for complete search history.

(56) References Cited

U.S. PATENT DOCUMENTS

| 2,041,065 A * | 5/1936 | Hemphill ............ B60T 11/00 188/265 |
| 6,161,657 A * | 12/2000 | Zhuang ............ B60N 2/23 188/265 |
| 2014/0144262 A1* | 5/2014 | Schuh ............ B25B 5/061 74/89.16 |

\* cited by examiner

*Primary Examiner* — Melanie Torres Williams
(74) *Attorney, Agent, or Firm* — Clement Cheng

(57) ABSTRACT

A railway car brake lock has a brake linkage arm connector configured to connect to a brake linkage arm. A draw rod is connected to the brake linkage arm connector. The draw rod has a locking rack with a plurality of locking rack teeth. An outside shell holds the locking rack, while allowing the locking rack to slide between a locking rack engaged position and a locking rack disengaged position. The locking rack engaged position corresponds to a railway car brake engaged position and wherein the locking rack disengaged position corresponds to a railway car brake disengaged position. A locking actuator piston has locking actuator piston teeth that engage the locking rack teeth when the locking actuator piston slides from a locking actuator piston disengaged position to a locking actuator piston engaged position.

8 Claims, 6 Drawing Sheets

RAILWAY CAR BRAKE LOCK

FIELD OF THE INVENTION

The present invention is in the field of railway car brakes.

DISCUSSION OF RELATED ART

Railway car brakes have been made with a air powered parking brakes. These parking brakes depend on constant air pressure. Under inconsistent air pressure, the parking brakes can loosen leading to slippage. Also, human error can lead to rollaway accidents on railways. The predominant current system is the air brake system. When the train parks on rail line and releases air from air brake pipes it needs to take measures to prevent rolling away.

SUMMARY OF THE INVENTION

The present invention is an anti-rolling away device that will lock the piston stem to stop unintended movement. If unintended movement such as moving back happens because air is leaking from a brake cylinder, the cylinder will cause the brake to release. The present invention locks the brake piston stem from retraction. The anti-roll away function automatically disconnects when the locomotive connects to railcars and transmits air pressure into the brake pipes. When the railcars do not connect to a locomotive and there is a need to release the locked anti-rolling away state, a handle on the device allows manual release.

A railway car brake lock has a brake linkage arm connector configured to connect to a brake linkage arm. A draw rod is connected to the brake linkage arm connector. The draw rod has a locking rack with a plurality of locking rack teeth. An outside shell holds the locking rack, while allowing the locking rack to slide between a locking rack engaged position and a locking rack disengaged position. The locking rack engaged position corresponds to a railway car brake engaged position and wherein the locking rack disengaged position corresponds to a railway car brake disengaged position. A locking actuator piston has locking actuator piston teeth that engage the locking rack teeth when the locking actuator piston slides from a locking actuator piston disengaged position to a locking actuator piston engaged position.

The locking actuator piston engaged position locks the locking rack which locks the draw rod which locks the railway car brake. The brake linkage arm connector is preferably gimballed. The locking actuator piston has a manual release mechanism with a release cam that receives a rotating protrusion that presses down the release cam to make a downward movement that disengages the locking actuator piston teeth from the locking rack teeth when a user rotates a handle of the manual mechanism. The locking actuator piston is connected to a pressure plate which is actuated by pressure difference between an upper air chamber air passage and a lower air chamber. The locking actuator piston is air powered with a time delay mechanism and biased into the locking actuator piston engaged position by a spring.

Figure 1:
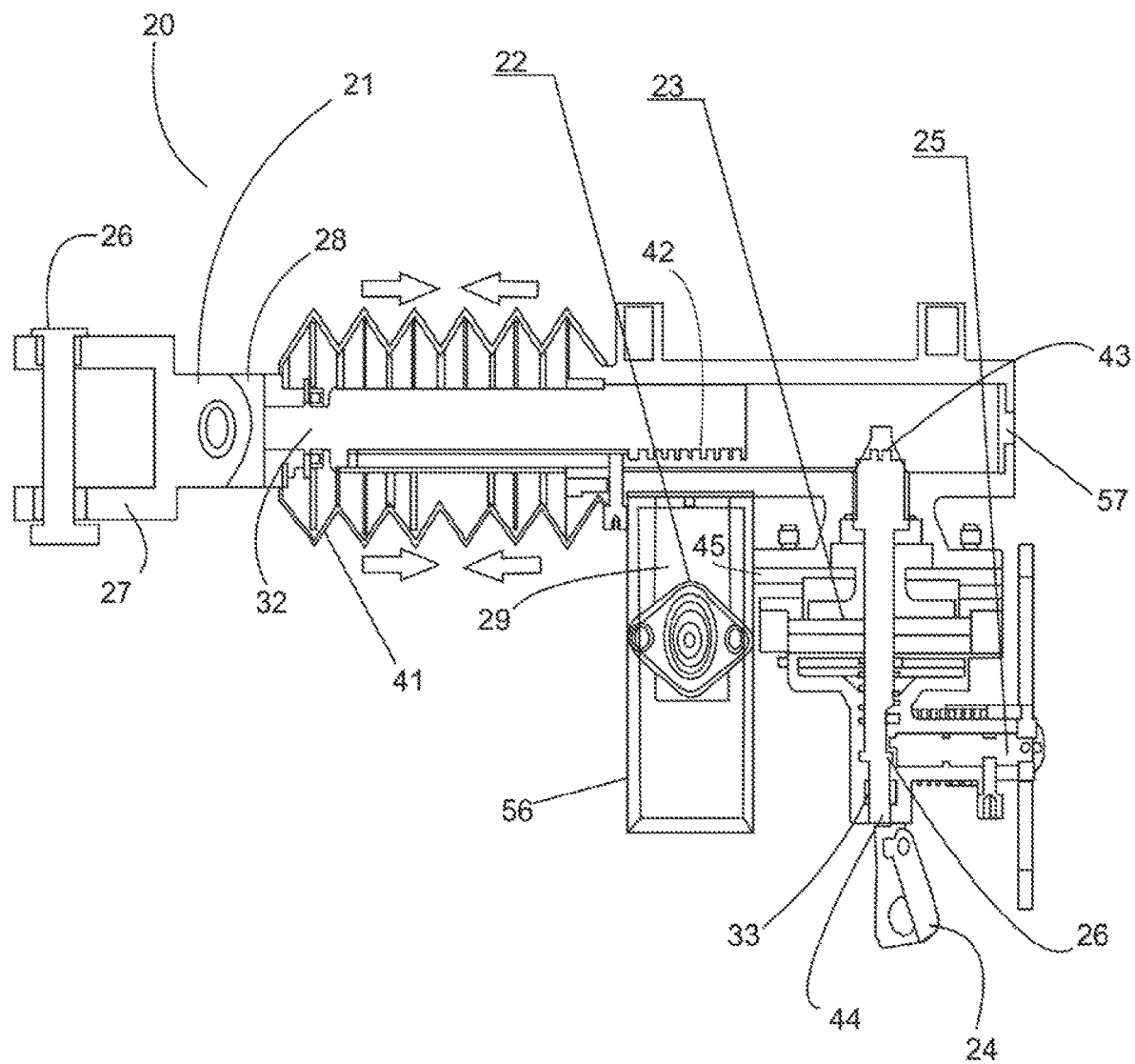
FIG. 1 is a cross-section diagram showing the brake piston locking mechanism of the present invention.
Figure 2:
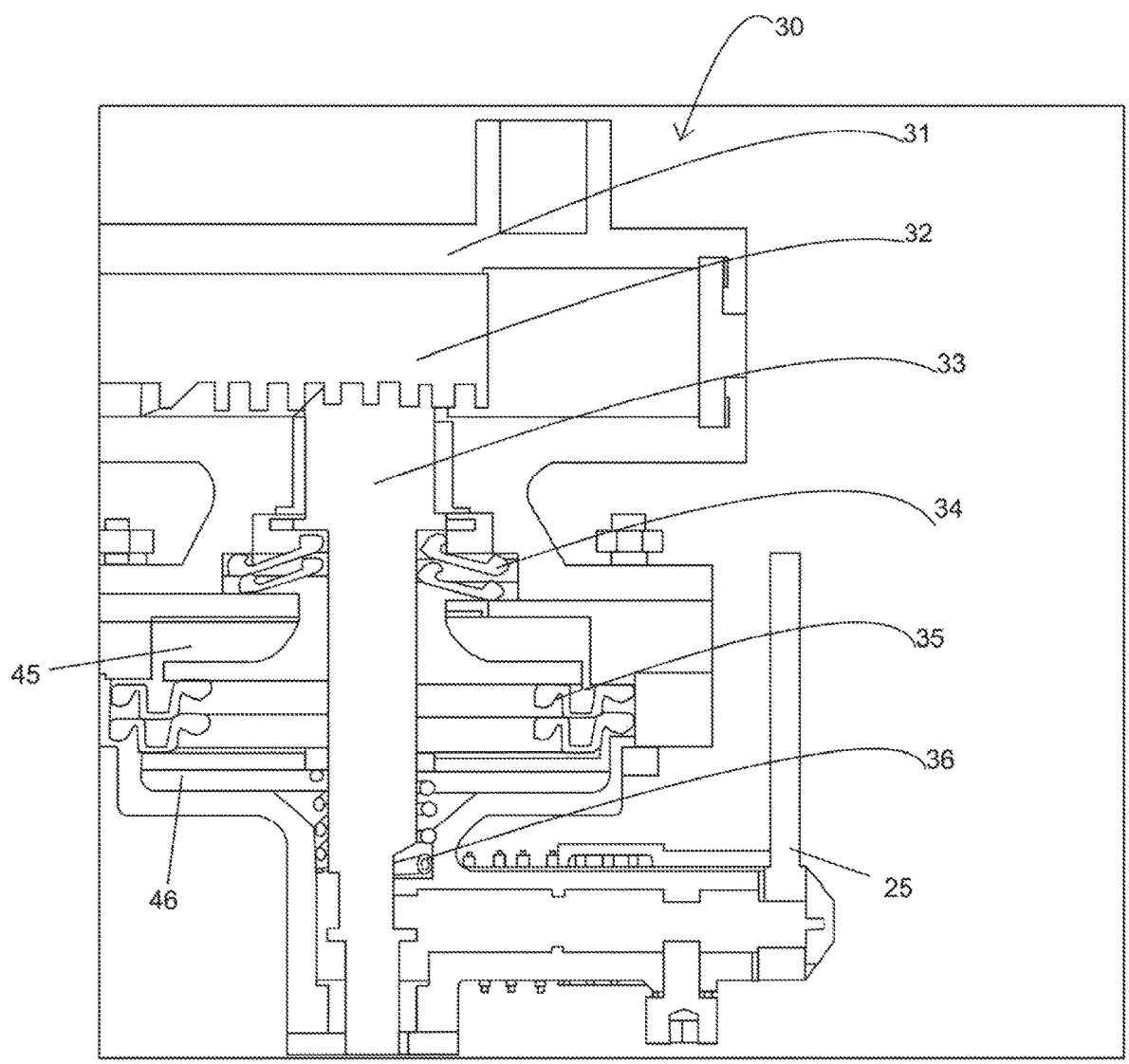
FIG. 2 is a cross-section diagram showing how the locking actuator piston engages to the locking rack.

The following call out list of elements can be a useful guide in referencing the elements of the drawings.

20 Railway Car Brake Lock
21 Front End Arm Connector
22 Time Delay Mechanism
23 Locking Actuator
24 Status Indicator
25 Manual Release Mechanism
26 Pin Roll
27 Piston Connector
28 Draw Rod
29 Pressure Adjuster
30 Locking Mechanism
31 Outside Shell
32 Locking Rack
33 Locking Actuator Piston
34 Upper Lamina
35 Lower Lamina
36 Locking Actuator Piston Spring
41 Locking Rack Sheath
42 Locking Rack Teeth
43 Locking Actuator Piston Teeth
44 Locking Actuator Piston Lower End
45 Upper Air Chamber Air Passage
46 Lower Air Chamber
51 Release Cam
52 Swivel Joint
53 Status Indicator Abutment
54 Status Indicator Flange Opening
55 Status Indicator Flange
56 Pressure Delay Chamber
57 Locking Rack Stopper
61 Cut-Out Cock
62 Combination Dire Collector
63 Brake Cylinder
64 Auxiliary Reservoir
65 Train Brake Pipe
66 Accelerated Release Reservoir
67 Air Control Valve
68 Brake Linkage Arms
601 Small membrane oil dish
602 Small diaphragm stem fixed plate
603 first membrane
604 Membrane mount
605 second membrane
606 Large diaphragm valve stem fixed platen
608 Locking valve stem
609 Middle valve body
610 Large diaphragm lower valve body fixed pressure plate
612 Lower valve body
613 Bolt valve stem lower copper bushing
614 Valve body fixed pressure plate
615 Upper valve body
616 bushing
617 Upper tongue copper bushing
618 Product nameplate
620 Retaining bolt
621 spring washer
622 first nut
623 second nut
624 Manual relief shaft 625 Manual relief handle
626 Heavy Duty Slotted Spring Pin
627 twelve spring washers
628 Set screws
629 eight spring washers
630 End cap
631 Hole retaining snap ring
632 Nylon seal
633 Anti-sliding lever
634 Set screw
635 Bellows
636 third nut
637 Homemade nut locking piece
638 bushing 20×30×12
639 Anti-sliding rod connector
641 Time delay air cylinder
642 first bolt
643 second bolt
644 third bolt
645 O-rings Series
646 Manual lock ease
647 Compression spring
648 Anti-slip status indicator
649 Anti-slip display rubber pad
650 Hose clamp

DETAILED DESCRIPTION OF THE PREFERRED EMBODIMENT

The present invention is a railway car brake lock 20 shown in FIG. 1. As seen in the first figure, the pin roll 26 is the portion that is connected to the braking system of the railcar. The pin roll 26 is formed as a pin such as a cylindrical metal bolt that connects to an opening in a planar shaped control arm for example. The pin roll connects the piston connector 27 to the railcar braking system and can be gimballed. The present invention holds the railcar braking system with the pin roll 26. The piston connector 27 is formed as a yoke that connects to a lever arm of the railcar braking system. The piston connector 27 is connected to a front end arm connector part 21, which can provide a gimballed connection as a brake linkage arm connector. The front end arm connector part is an adapter connector that connects the piston connector 27 to a draw rod 28. The draw rod has a locking rack 32. The locking rack 32 holds the position of the pin roll 26 when the wheels on the railcar need to be braked. The locking rack 32 is covered by a locking rack sheath 41 that can be formed as an accordion shaped cover fitting over the locking rack. The locking rack has a plurality of locking rack teeth 42. The draw rod is retained within a draw rod chamber and a locking rack stopper 57 maintains a regular and consistent alignment between the locking rack teeth 42 and the locking actuator piston teeth 43.

The locking rack teeth 42 mesh with locking actuator piston teeth 43 when the pair of engaging surfaces engage with each other. The locking rack teeth 42 engage by translational motion in a normal direction when the locking actuator piston teeth 43 travel toward the locking rack teeth 42. The locking actuator piston teeth 43 are mounted on the locking actuator 33. The locking actuator 33 is formed as a rod that translates up and down. The locking actuator 33 movement is air driven. An upper air chamber air passage 45 receives air pressure from a air pipe.

The air pipe pressurizes a time delay mechanism 22. The time delay mechanism 22 has a pressure adjuster 29 for setting the amount of time of the time delay. The pressure adjuster 29 releases air from a pressure delay chamber 56. The time delay is thus adjusted by adjusting the rate at which air leaves the pressure delay chamber 56. The adjustment is made by the pressure adjuster 29. The time delay mechanism 22 is connected to the upper air chamber air passage 45. The upper air chamber air passage 45 is opposite a lower air chamber 46 with a pressure plate in between. The locking actuator piston is connected to a pressure plate which is actuated by pressure difference between an upper air chamber air passage and a lower air chamber. When the upper air chamber air passage 45 pressure is lower than the lower air chamber 46 air pressure, the locking actuator piston 33 moves so that the locking actuator piston teeth 43 engage to the locking rack teeth 42. The time delay mechanism 22 can be set at a working pressure value of the anti-rolling away device to suit the pressure inside the air pipes of the train such as 500 pk or 600 pk. When the pressure of the train is lower than the set value, the lock locks. When the pressure of train is higher than the set value, lock releases. The time delay part ensures a delay time so as to not interfere with train's brake.

Figure 3:
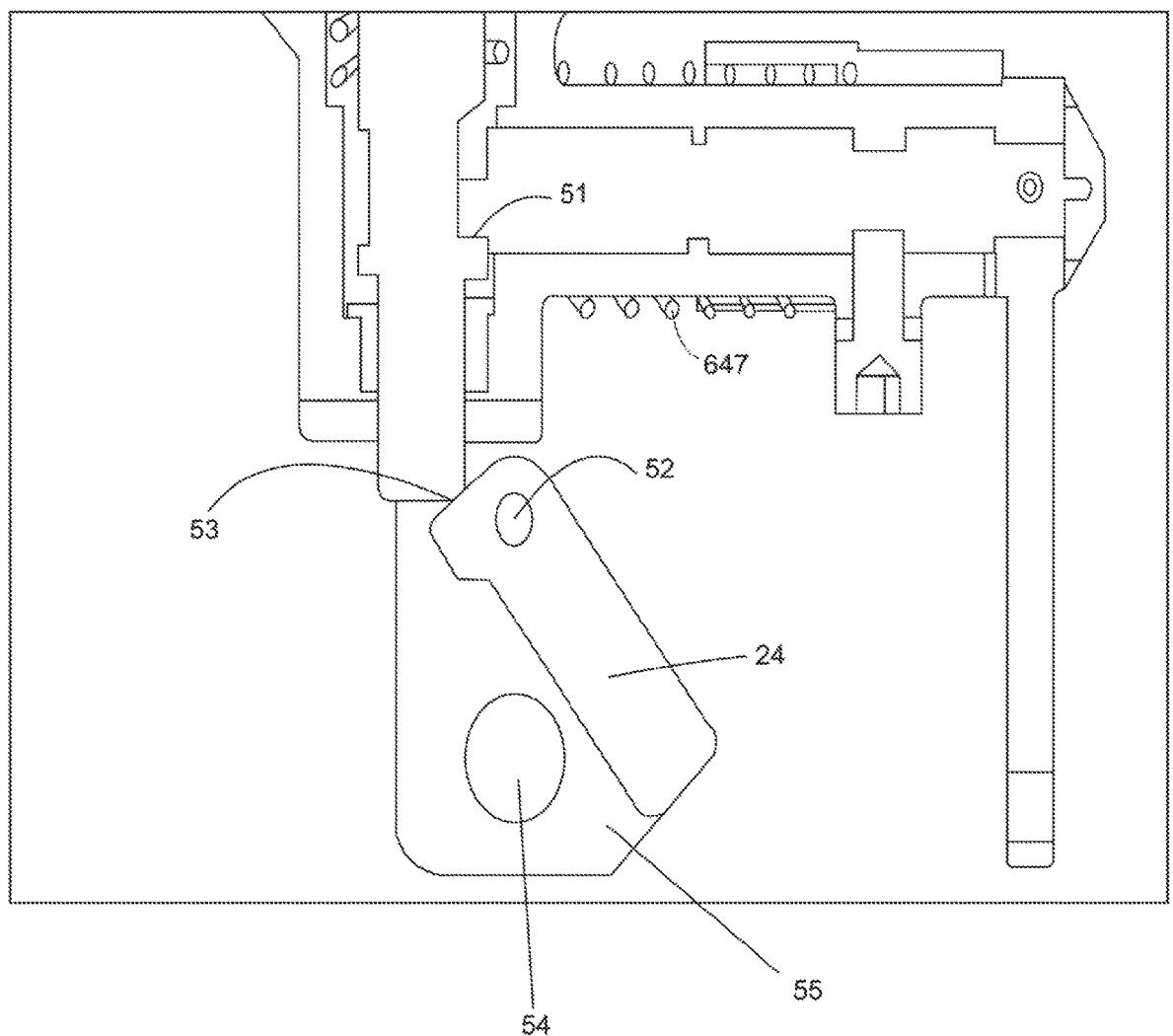
FIG. 3 is a diagram of the release mechanism.

A manual release 26 has a protrusion that inserts into an indentation of the locking actuator piston. The manual release has a handle that the user grasps for disconnecting engagement between locking actuator piston 33 and locking rack 32. The manual release handle is shown in FIG. 3. The third figure shows that the release cam 51 receives a rotating protrusion that presses down the release cam 51 to make a downward movement. The downward movement disengages the locking actuator piston teeth 43 from the locking rack teeth 42. The rotating protrusion is actuated by a manual release lever handle. The manual release lever handle rotates. The release cam spring 53 can be a coil spring in tension rather than compression that biases the manual release handle into an engaged position.

A status indicator 24 can be provided at a lower end of the locking actuator piston. The locking actuator piston lower end 44 extends downwardly and protrudes out of the locking actuator piston assembly so that the locking actuator piston lower end 44 presses downward on a status indicator abutment 53. The status indicator abutment 53 is a bearing surface that when pressed downwardly on makes a swivel motion on a swivel joint 52. The status indicator 24 swivels upwardly in a swinging motion so that the status indicator flange opening 54 is clear and visibly open. The visible openness indicates an unlocked mode. The status indicator flange 55 is preferably formed with a circular opening that acts as an indicator.

Figure 4:
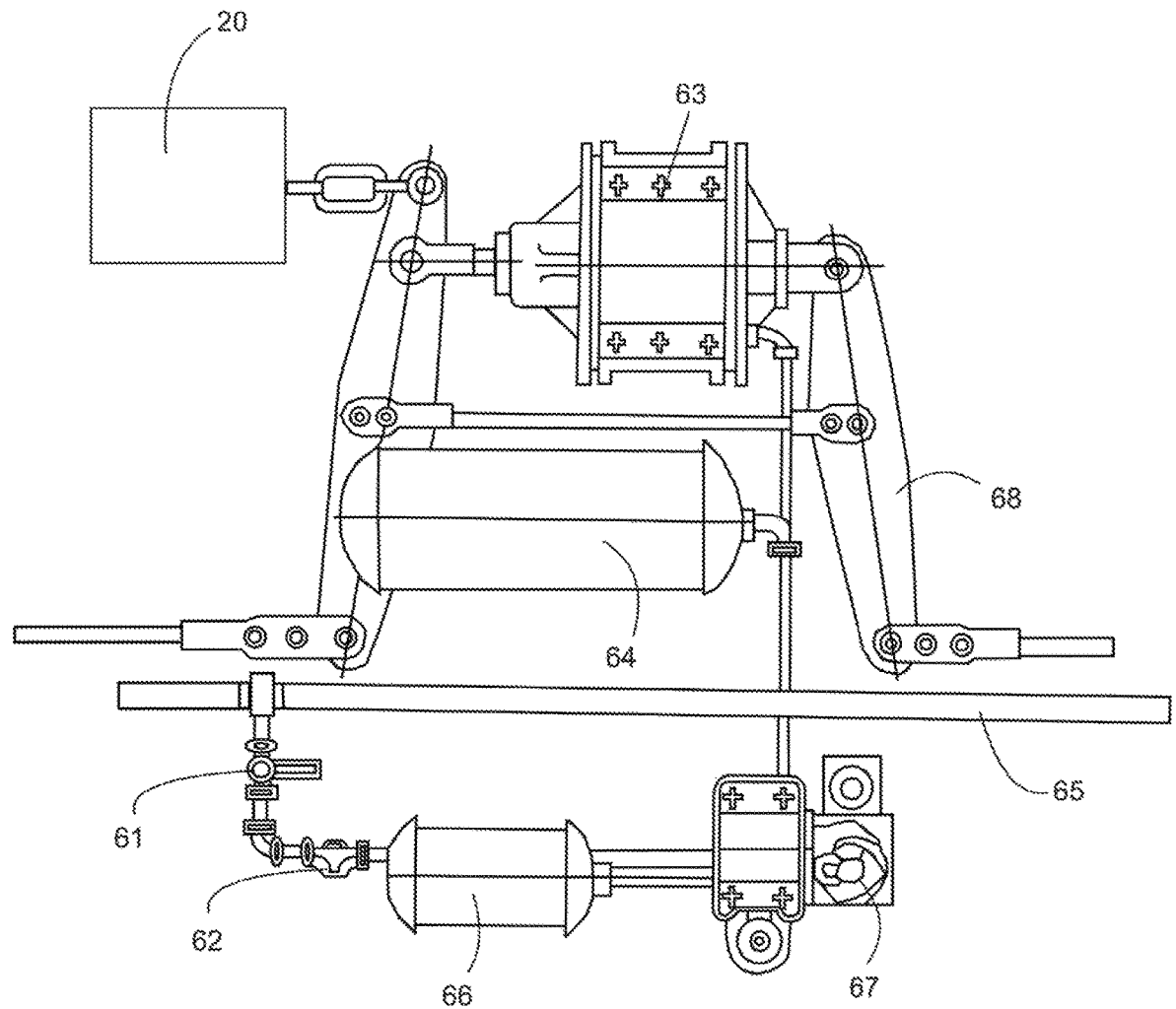
FIG. 4 is a diagram of the installation location of the railway car brake lock 20 of the present invention.
Figure 5:
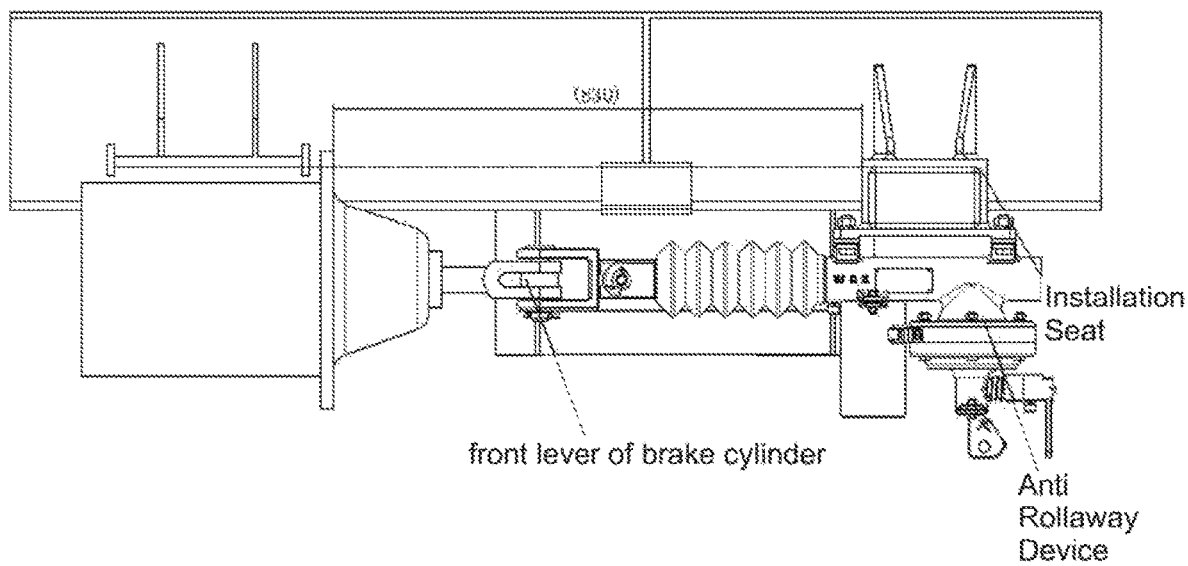
FIG. 5 is an installation diagram.
Figure 6:
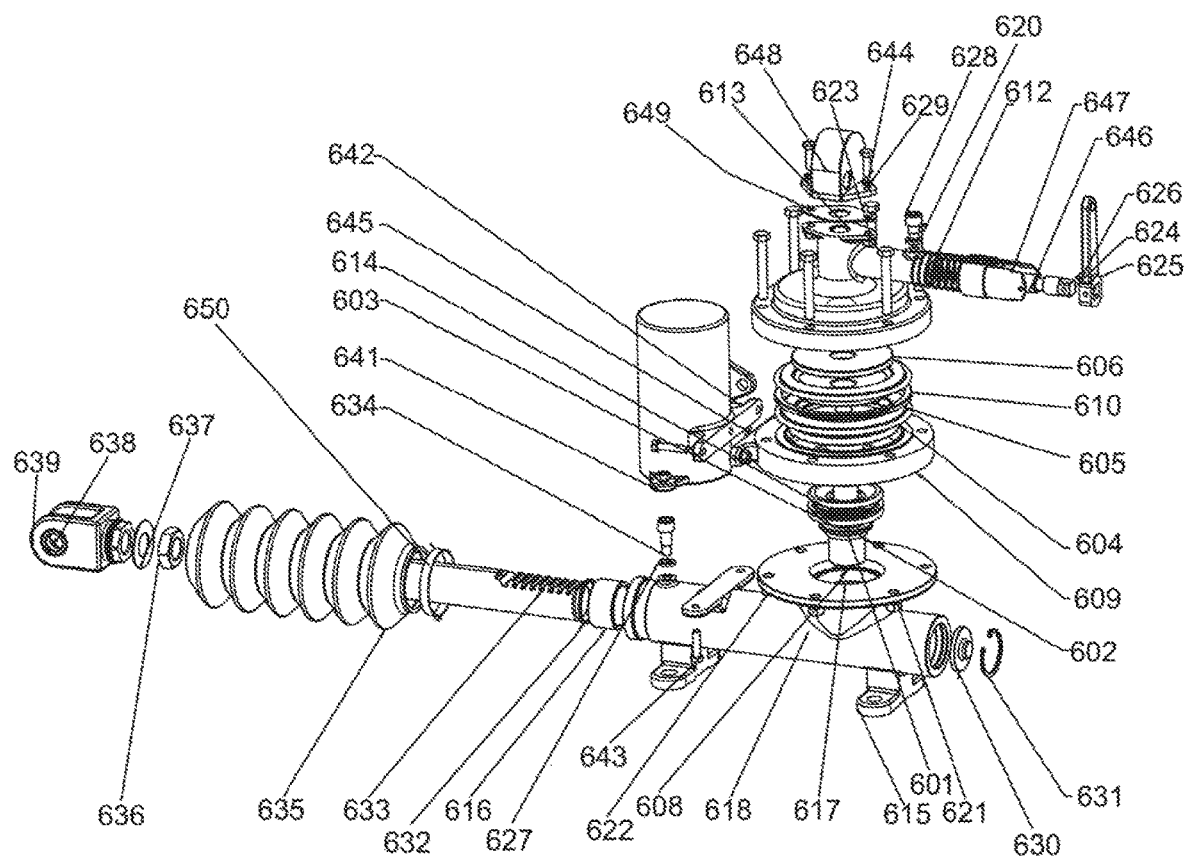
FIG. 6 is a perspective exploded view diagram showing assembly

The general placement of the railway car brake lock 20 is shown in FIG. 4. The railway car brake lock 20 can be connected to any of the brake linkage arms 68. When a train brake pipe decreases pressure the brake operates. When train brake pipe increases pressure, the brake releases. When locomotive separates from railcars or an emergency valve has been activated, the train can brake to stop automatically. When air pressure inside a train brake pipe decreases, the air brake equipment produces force that passes to basic brake device so that the device finally contacts brake shoes to hold the wheels which stops the train. After a train parks, the compressed air inside brake cylinder passes the pressure force to basic brake device through a piston. The basic brake device has a piston, brake shoes and levers. The basic brake device enlarges pressure force from compressed air inside the brake cylinder and passes it to brake shoes that press on wheels to keep railcars stopped. In this system, the system is powered by a train brake pipe 65 which draws air pressure from the locomotive. A cut-out cock 61 provides an air valve for activating the brake release mechanism. A combination dire collector 62 controls pressure to a accelerated release reservoir 66 which is a tank of pressurized fluid such as air. The train has a brake cylinder 63 which is connected to links which connect to brake pads. The air control valve 67 then controls pressure to a larger tank of air which is the auxiliary reservoir 64. The air control valve 67 also passes air to the brake cylinder 63 which actuates the brake linkage arms 68. The brake linkage arms 68 have a pivoting relationship to each other and are secured and mounted to the railway car frame. The railway car frame is typically formed as a truck.

During operation, when the train parks, the air will leak from the brake cylinder that actuates the piston so that finally the brake shoe will start to slip and separate from its engagement of the wheel. To keep railcars from rolling away, every railcar should have a hand brake. To turn the wheel of a hand brake, one can move the piston on brake cylinder and then actuate the basic brake device which then makes the brake shoes press on the wheels. However, the hand brake demands a trained worker to operate it and the manner of its mounting is somewhat time inefficient and dangerous such that use of it is deterred. The handbrake is a separate mechanism from the railway car brake lock 20. The railway car brake lock 20 is an automatic system that does not require a worker to manually operate it. The railway car brake lock 20 deactivates with an input of air pressure and activates when the air pressure is removed. It is a secondary locking mechanism to retain the pre-existing brake cylinder 63.

The locking mechanism 30 of the railway car brake lock 20 has a variety of different parts including an outside shell 31 that holds the locking rack 32 in a sliding relationship with outside shell 31. The outside shell 31 can be formed with a slot so that the locking rack 32 slides within the slot. The locking rack 32 has the function of arresting rollaway of the railway car. The locking actuator piston 33 is formed as a bolt rod that arrests the locking rack 32 when engaged to the locking rack 32. The bolt rod has an upside lamina 34 and a downside lamina 35 which are plates and seals that make an upper air chamber air passage 45 which opposes a lower air chamber 46. The plates have a larger surface area than the locking actuator piston 33 so that the locking actuator piston 33 is biased up and down depending upon the relative air pressure between the upper and lower chambers. The plates are connected to the locking actuator piston 33. The locking actuator piston 33 moves up and down depending upon variations in air pressure so that the railway car brake lock 20 engages or disengages between a locked mode and an unlocked mode. A spring 36 can provide a bias against the air pressure for example so that when air pressure is not present, the spring 36 automatically engages the locking actuator piston 33.

The manual release has a manual release handle, a manual release turn axle and a manual release locking cover. Using manual release can deactivate the anti-rolling away device. Manual release locking cover keeps the handle in the right position when the anti-rolling away device is operational.

The final assembly includes: a small membrane oil dish 601; a small diaphragm stem fixed plate 602; a first membrane 603; a membrane mount 604; a second membrane 605; a large diaphragm valve stem fixed platen 606; a locking valve stem 608; a middle valve body 609 a large diaphragm lower valve body fixed pressure plate 610; a lower valve body 612; Bolt valve stem lower copper bushing 613; valve body fixed pressure plate 614; upper valve body 615; bushing 616; upper tongue copper bushing 617; product nameplate 618; retaining bolt 620; spring washer 621; first nut 622; second nut 623; manual relief shaft 624; manual relief handle 625; heavy duty slotted spring pin 626; twelve spring washers 627; set screws 628; eight spring washers 629; end cap 630; hole retaining snap ring 631; nylon seal 632; anti-sliding lever; set screw 634; bellows 635; third nut 636; homemade nut locking piece 637; bushing 20×30×12 638; anti-sliding rod connector 639; time delay air cylinder 641; first bolt 642; second bolt 643; third bolt 644; o-rings series 645; manual lock ease 646; compression spring 647; anti-slip status indicator 648; anti-slip display rubber pad 649; and hose clamp 650.

The invention claimed is:

1. A railway car brake lock comprising:
   a. a brake linkage arm connector configured to connect to a brake linkage arm;
   b. a draw rod connected to the brake linkage arm connector, wherein the draw rod has a locking rack with a plurality of locking rack teeth;
   c. an outside shell holding the locking rack, while allowing the locking rack to slide between a locking rack engaged position and a locking rack disengaged position, wherein the locking rack engaged position corresponds to a railway car brake engaged position and wherein the locking rack disengaged position corresponds to a railway car brake disengaged position; and
   d. a locking actuator piston having locking actuator piston teeth that engage the locking rack teeth when the locking actuator piston slides from a locking actuator piston disengaged position to a locking actuator piston engaged position, wherein the locking actuator piston engaged position locks the locking rack which locks the draw rod which locks the railway car brake.

2. The railway car brake lock of claim 1, wherein the brake linkage arm connector is gimballed.

3. The railway car brake lock of claim 1, wherein the locking actuator piston has a manual release mechanism with a release cam that receives a rotating protrusion that presses down the release cam to make a downward movement that disengages the locking actuator piston teeth from the locking rack teeth when a user rotates a handle of the manual mechanism.

4. The railway car brake lock of claim 3, wherein the locking actuator piston is connected to a pressure plate which is actuated by pressure difference between an upper air chamber air passage and a lower air chamber.

5. The railway car brake lock of claim 3, wherein the locking actuator piston is air powered with a time delay mechanism and biased into the locking actuator piston engaged position by a spring.

6. The railway car brake lock of claim 1, wherein the locking actuator piston is connected to a pressure plate which is actuated by pressure difference between an upper air chamber air passage and a lower air chamber.

7. The railway car brake lock of claim 6, wherein the locking actuator piston is air powered with a time delay mechanism and biased into the locking actuator piston engaged position by a spring.

8. The railway car brake lock of claim 1, wherein the locking actuator piston is air powered with a time delay mechanism and biased into the locking actuator piston engaged position by a spring.

* * * * *